United States Patent [19]

Beveridge

[11] 4,106,445

[45] Aug. 15, 1978

[54] RECIPROCATING PISTON MACHINE WITH COMPLETE COMBUSTION SYSTEM

[76] Inventor: John H. Beveridge, 177 Cornelio, San Clemente, Calif. 92672

[21] Appl. No.: 621,999

[22] Filed: Oct. 14, 1975

Related U.S. Application Data

[63] Continuation of Ser. No. 389,277, Aug. 17, 1973, abandoned.

[51] Int. Cl.² .................... F02B 25/12; F02B 17/00
[52] U.S. Cl. ...................... 123/53 A; 123/32 ST; 123/75 B; 123/DIG. 4
[58] Field of Search .............. 123/53 A, 53 B, 53 R, 123/75 B, 32 ST, DIG. 4, 53 BA, 53 AA

[56] References Cited

U.S. PATENT DOCUMENTS

| | | | |
|---|---|---|---|
| 642,176 | 1/1900 | Thomson | 123/53 A |
| 691,017 | 1/1902 | Thomson | 123/53 A |
| 1,498,757 | 6/1924 | Robertson | 123/53 A |
| 1,555,454 | 9/1925 | Buggatti | 123/53 B |
| 2,091,412 | 8/1937 | Mallory | 123/53 A |
| 2,234,267 | 3/1941 | Mallory | 123/53 A |
| 2,269,948 | 1/1942 | Mallory | 123/53 A |
| 2,280,712 | 4/1942 | Mallory | 123/53 A |
| 3,866,582 | 2/1975 | Lagarde | 123/53 A |
| 3,923,019 | 12/1975 | Yamada | 123/75 B X |
| 3,934,562 | 1/1976 | Isaka | 123/75 B X |

FOREIGN PATENT DOCUMENTS 30,074 of 1909 United Kingdom ............... 123/53 BA

*Primary Examiner*—Wendell E. Burns
*Attorney, Agent, or Firm*—Warren T. Jessup

[57] ABSTRACT

A reciprocating piston internal combustion machine is provided in which the components are designed and constructed in a manner to give complete combustion by providing a stratified charge which is mixed early in the combustion process.

6 Claims, 5 Drawing Figures

RECIPROCATING PISTON MACHINE WITH COMPLETE COMBUSTION SYSTEM

RELATED APPLICATION

This is a continuation of patent application Ser. No. 389,277, filed Aug. 17, 1973 now abandoned.

BACKGROUND OF THE INVENTION

It is the object of this invention to provide complete combustion under conditions which minimize the formation of pollutants, including oxides of nitrogen, carbon monoxide and partially burned hydrocarbons.

In substantially all present-day internal combustion engines with spark ignition, a near rich fuel-air mixture is utilized to give reliable ignition and combustion for rapid engine acceleration and smooth operation. Additional air may be introduced into the exhaust system to complete the combustion process. Also, exhaust products are sometimes introduced into the air intake system to reduce the concentration of oxygen and thereby reduce the formation of oxides of nitrogen by reducing the combustion temperature.

Although these techniques are effective in reducing the pollutants produced by an engine, the additional equipment and reduction of power from a given size engine make these techniques relatively unattractive.

In the invention disclosed herein, these shortcomings have been eliminated for four-stroke and two-stroke cycle engines. This invention provides a means for reliably igniting a quite lean mixture in the primary or main cylinder. A small auxiliary cylinder with spark ignition has a near rich mixture which is reliably ignited by the spark under all operating conditions. The energy released and the turbulence created when the hot gases from the auxiliary cylinder flow into the main cylinder cause ignition over a wide operating range mixture strength. Thus, relatively cool and complete combustion takes place in the main cylinder which results in lower concentrations of unburned hydrocarbons, carbon monoxide and oxides of nitrogen in the engine exhaust.

The hot gases from the small auxiliary cylinder mix with the products of combustion in the main cylinder early in the expansion cycle thereby forming an overall lean products of combustion. The small piston in the auxiliary cylinder aids in the mixing process by expelling the burning gases into the main cylinder.

In addition to the clean burning characteristics of this form of internal combustion engine, the control of the engine is not substantially more difficult than the control for conventional engines. The small auxiliary cylinder may be operated with full atmospheric intake pressure at all times while the main cylinder can be controlled by conventional inlet throttling. Thus, only conventional control means are required.

In accomplishing these and other objects, I have provided details of structure, exemplary forms of which are illustrated in the accompanying drawings herein.

DETAILED DESCRIPTION OF THE ILLUSTRATED EMBODIMENT

Figure 1:
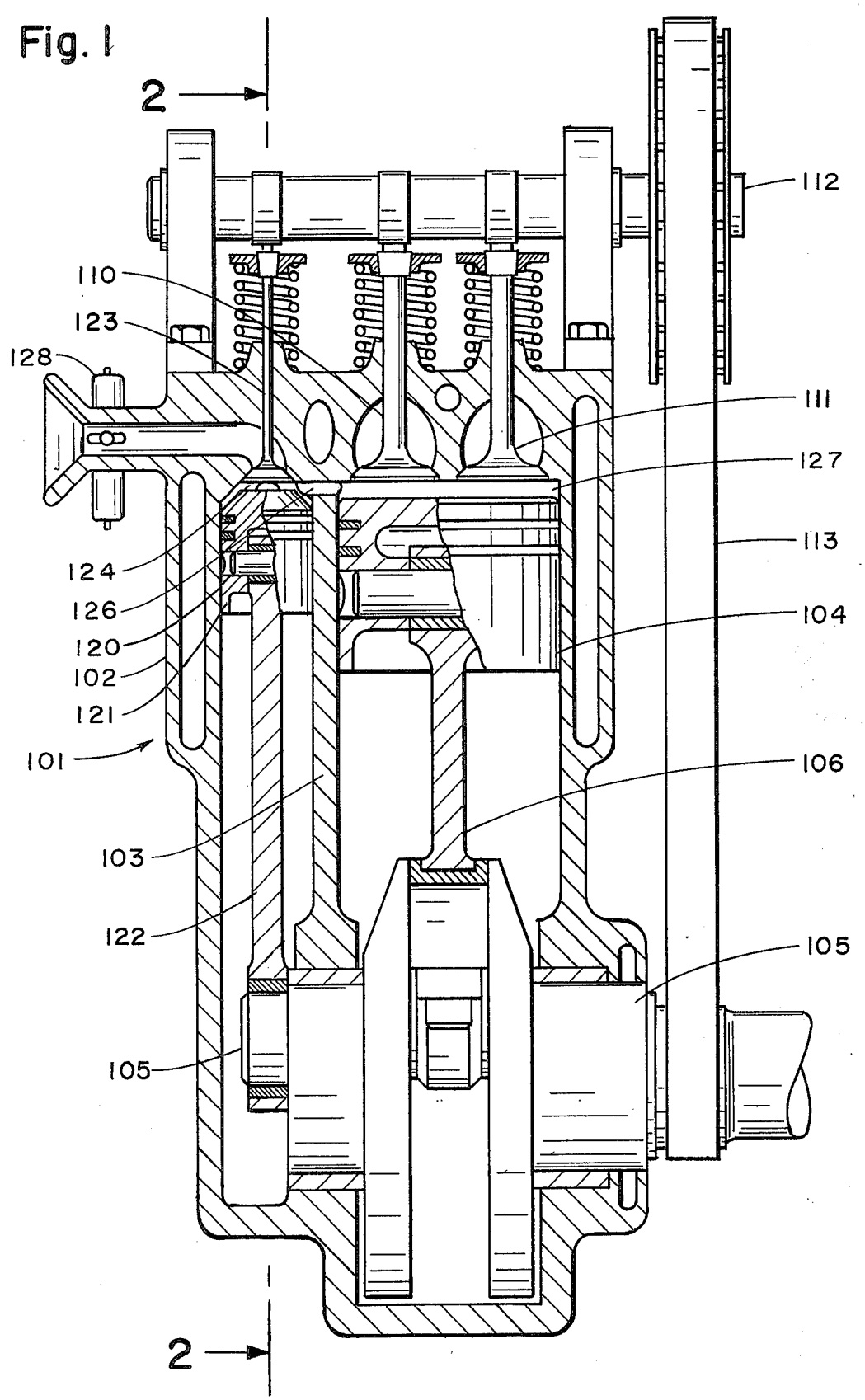
FIG. 1 is a longitudinal section of a single-cylinder four-cycle internal combustion engine in a plane parallel to the axis of the crankshaft and through the axes of the main and auxiliary cylinders.
Figure 2:
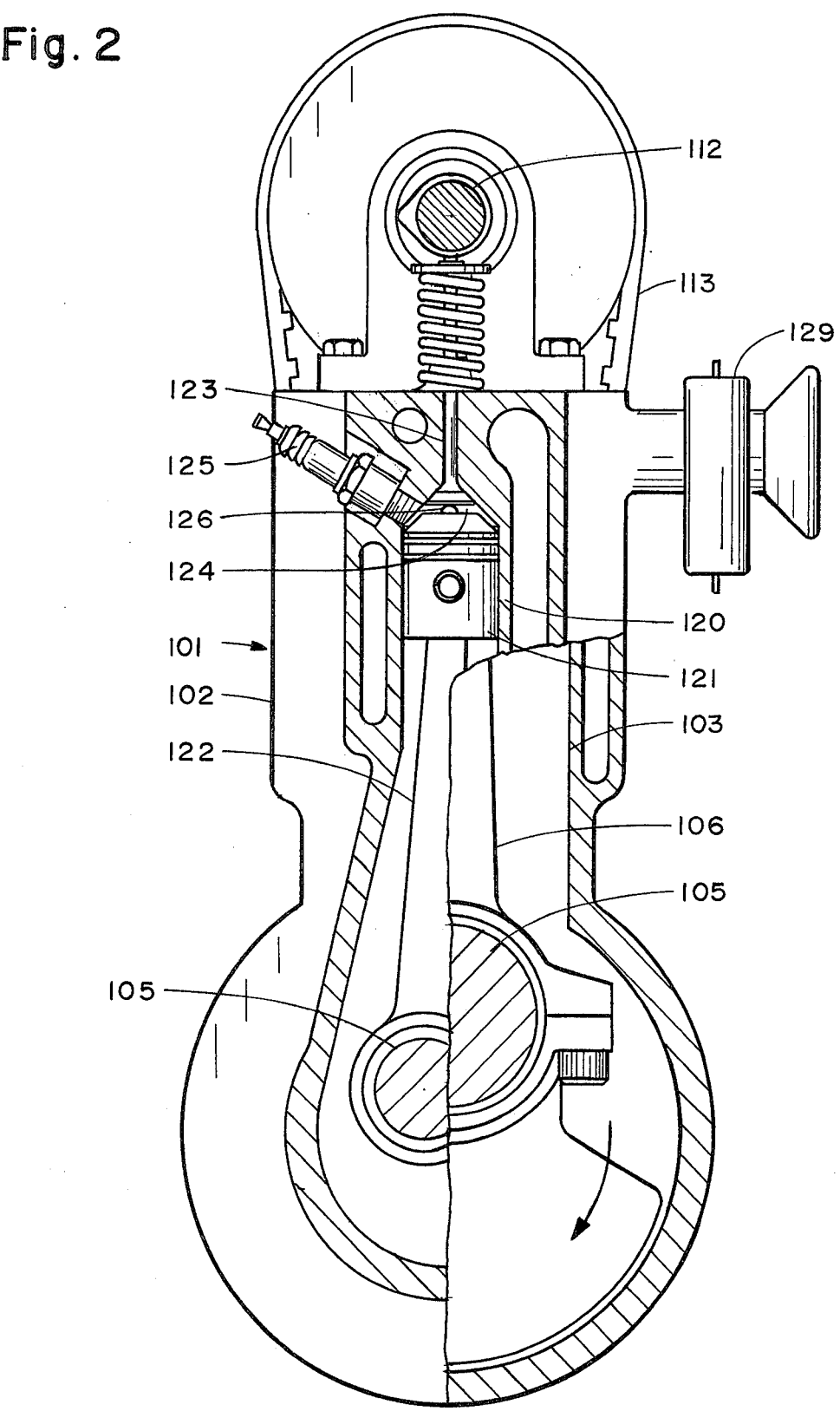
FIG. 2 is a section along line 2—2 of FIG. 1.

In FIGS. 1 and 2 there is shown by way of example a single cylinder four-stroke cycle engine with an auxiliary cylinder combustion chamber. Of course it should be realized that the principles of the invention are equally applicable to engines having a plurality of cylinders. The engine, designated generally as 101, has a block member 102 containing a cylinder 103, a piston 104 reciprocable in said cylinder, a crankshaft 105 rotatably mounted in said block member, a connecting rod 106 pivotally connected to said piston and to said crankshaft. The block member upper portion has an inlet valve 110 and an exhaust valve 111 which are actuated by a camshaft 112 driven at one-half crankshaft speed by the timing belt 113.

The block member has a small auxiliary cylinder 120 fitted with a piston 121 and connected to the crankshaft 105 by means of a connecting rod 122. The auxiliary cylinder upper portion has an inlet valve 123 which is actuated by the camshaft 112. The combustion chamber 124 of the auxiliary cylinder has a spark plug 125. A passage 126 interconnects the auxiliary cylinder combustion chamber 124 with the combustion chamber 127 in the primary or main cylinder.

A small carburetor 128 supplies a nominally rich fuel-air mixture to the auxiliary cylinder via the inlet valve 123. Another carburetor or fuel injection means 129 supplies a lean fuel-air mixture to the main cylinder via the inlet valve 110.

In operation the piston 121 in the auxiliary cylinder and the piston 104 in the main cylinder reciprocate in approximate synchronization, however best operation is obtained with the auxiliary piston lagging the main piston. Ignition is initiated in the auxiliary cylinder combustion chamber 124 by the spark plug 125. The nominally rich fuel-air mixture burns readily and reliably. Flame propagation in the auxiliary cylinder combustion chamber 124 causes a rapid temperature-pressure rise in the gases therein. These hot gases flow out into the main cylinder combustion chamber 127 via the passage 126 creating turbulence and local energy input which causes ignition in the lean mixture in the main cylinder combustion chamber 127. The rising small piston 121 and small clearance volume in the auxiliary cylinder combustion chamber 124 expel nearly all of the initial products of combustion into main cylinder combustion chamber. During the power stroke the small auxiliary cylinder refills with lean products of combustion which are exhausted via exhaust valve 111.

An important feature of this invention is that reliable ignition occurs in the auxiliary cylinder combustion chamber 124 because the fuel-air mixture is near rich and not diluted by exhaust products from a previous cycle. Another desirable feature of this invention is that reliable ignition of the mixture in the main cylinder combustion chamber 127 is obtained with a predetermined range of relative sizes of the auxiliary cylinder compared with the main cylinder. More specifically, auxiliary cylinders having a displacement in the range of from one percent to twenty percent of the displacement (i.e. swept volume of the pistons) of the primary or main cylinders provide reliable ignition of each main cylinder charge.

Other important and interrelated design parameters are the cross-section area of the interconnecting flow passage 126 and the characteristics of the mixture in the main cylinder prior to ignition. These characterists include the fuel-air mixture ratio, mixture temperature and turbulence level and exhaust dilution. Engine roughness occurs when a large auxiliary cylinder is used with a small cross-section area flow passage and a more readily combustion mixture is present in the main cylinder combustion chamber. Non-uniform combustion occurs in the main cylinder combustion chamber when a very small auxiliary cylinder is used with a relatively large cross-section area flow passage and a slower burning mixture is characterized by being leaner fuel-air, colder, and less turbulent.

Another feature of this invention is that variable torque outputs can be obtained by changing the amount of fuel per cycle to the main cylinder by changing mixture fuel-air ratio. Thus, partial load operation may utilize more air per cycle with lower combustion temperatures and less inlet throttling loss as compared with conventional spark ignition four-stroke cycle engines. These factors improve part load thermal efficiency and reduce the concentration of pollutants in the engine exhaust. At very low torque outputs smooth and reliable engine firing requires inlet throttling to the main cylinder and/or preheating of the main cylinder inlet charge. Reliable engine firing is essential to maintaining a low concentration of unburned hydrocarbons in the exhaust. The overall lean mixture minimizes carbon monoxide and oxides of nitrogen in the exhaust.

Figure 3:
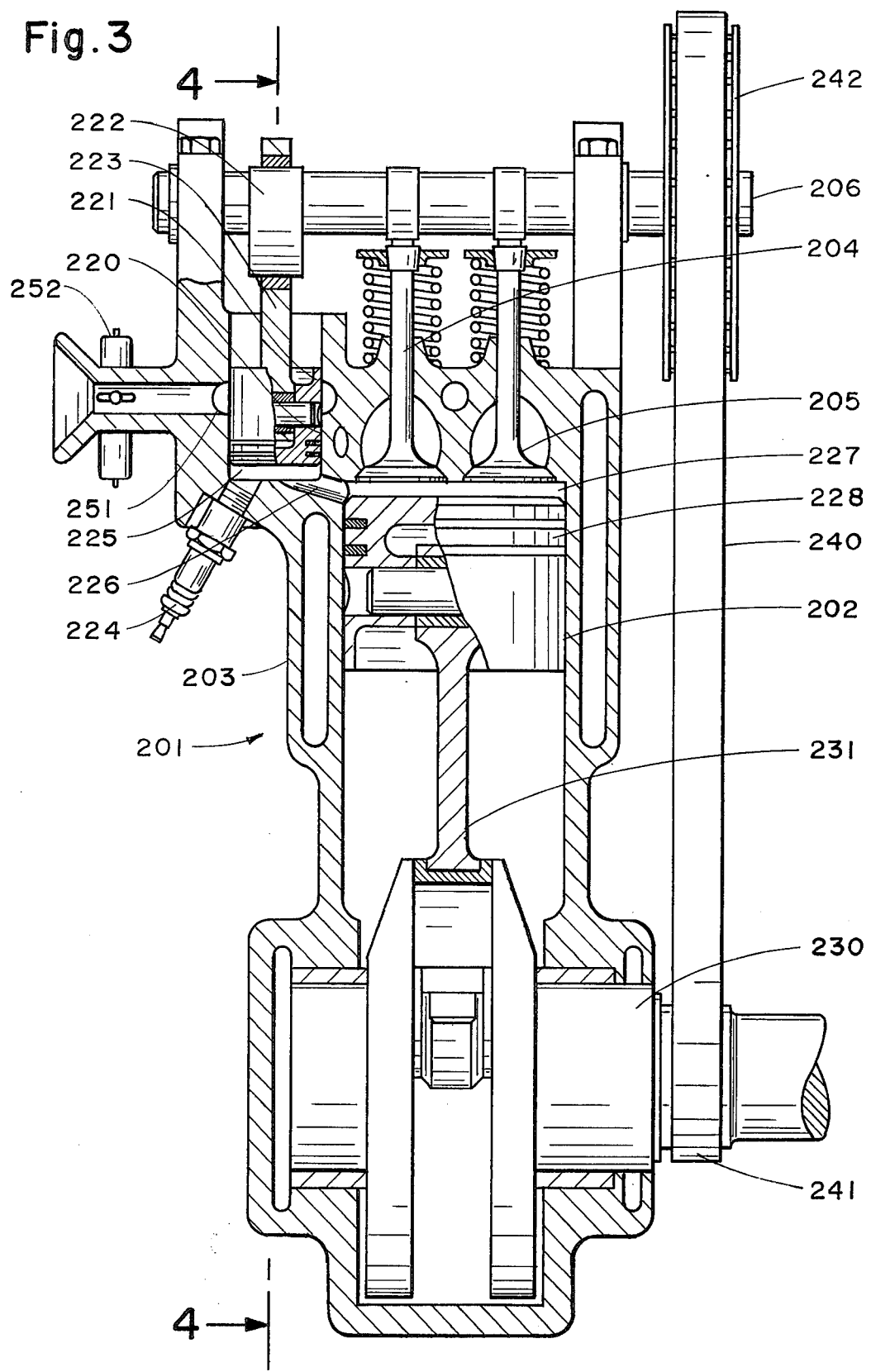
FIG. 3 is a longitudinal section of a single-cylinder four-cycle internal combustion engine in a plane parallel to the axis of the crankshaft and through the axes of the main and auxiliary cylinders.
Figure 4:
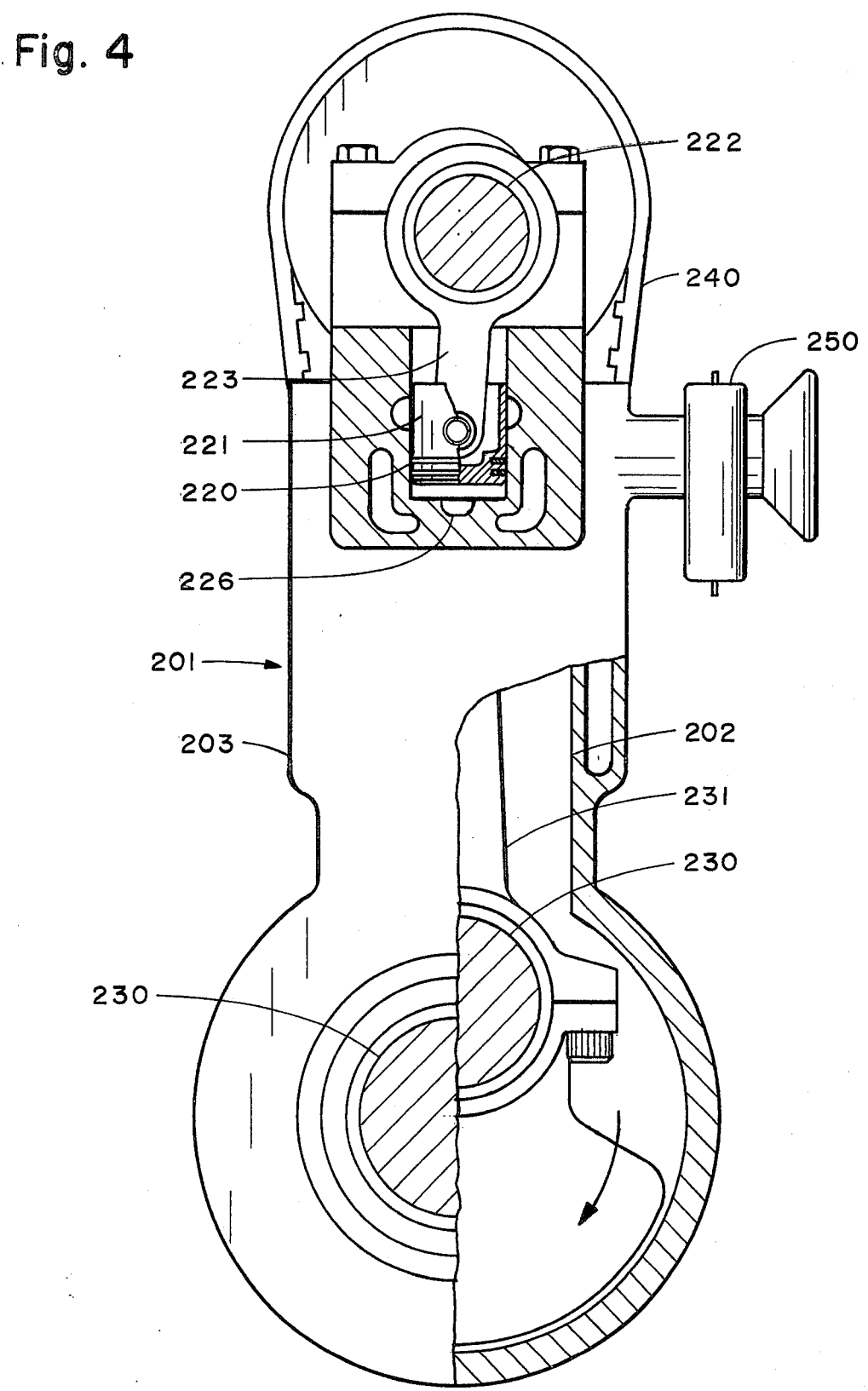
FIG. 4 is a section along line 4—4 of FIG. 3.

In FIGS. 3 and 4 there is shown a second embodiment of the invention in the form of a single-cylinder, four-stroke cycle engine which has the auxiliary piston drive from the camshaft. The engine, designated generally as 201, incorporates a cylinder 202 and a block member 203. The block member 203 has an inlet valve 204 and an exhaust valve 205 which are actuated by the camshaft 206. In the block member 203 there is a small auxiliary cylinder 220 with a piston 221 reciprocable therein. The auxiliary piston 221 is connected to an eccentric 222 on the camshaft 206 via the connecting rod 223. A spark plug 224 is provided in the combustion chamber 225 of the auxiliary cylinder. A passage 226 interconnects the auxiliary cylinder combustion chamber 225 to the combustion chamber 227 in the main cylinder 202.

The cylinder 202 is fitted with a piston 28 which is connected to the crankshaft 230 with a connecting rod 231.

The camshaft 206 is synchronized at one-half crankshaft 230 speed by the timing belt 240 in sprockets 241 and 242. The camshaft crank 222 is adjusted to cause the auxiliary piston 221 to reach top center position after the main piston 228 reaches top center position. Thus, the newly burned charge will be nearly completely expelled into the main chamber by the motion of the auxiliary piston 221.

The main cylinder inlet valve 204 is in communication with a carburetor 250 (FIG. 4) or fuel injector, which provides a lean fuel-air mixture. The auxiliary cylinder 220 has inlet ports 251 which are opened and closed by the reciprocating motion of the auxiliary piston 221. The auxiliary cylinder inlet ports 251 are in communication with a small carburetor 252 which provides a near rich readily ignitable fuel-air mixture.

The operation of the engine is similar to the operation of a conventional four-stroke cycle engine. The torque-speed can be adjusted by varying the throttle position of the main carburetor 250. The auxiliary cylinder carburetor may be wide open all the time provided passage 226 and the auxiliary cylinder 220 are appropriately sized. Clean exhaust and economical operation is assured by the reliable ignition of the lean charge in the main cylinder by the spark plug and rich mixture pilot charge in the auxiliary cylinder. Half-speed operation of the auxiliary piston 221 corresponds nicely with the four strokes of the main piston 228 when the auxiliary piston lags relative to the main piston. The inlet ports 251 may be opened during the late portion of the exhaust stroke. Negligible flow occurs through the auxiliary cylinder due to an approximate pressure balance between the main cylinder and the auxiliary cylinder. During the intake stroke of the main piston 228 fresh near rich mixture enters the auxiliary cylinder via the inlet ports 251 due to the suction or low pressure in the main cylinder. This flow purges the auxiliary cylinder of exhaust products. Closure of the auxiliary cylinder inlet ports 251 by the auxiliary piston 221 corresponds approximately to the closure of inlet valve 204 and start of compression in the main cylinder.

Figure 5:
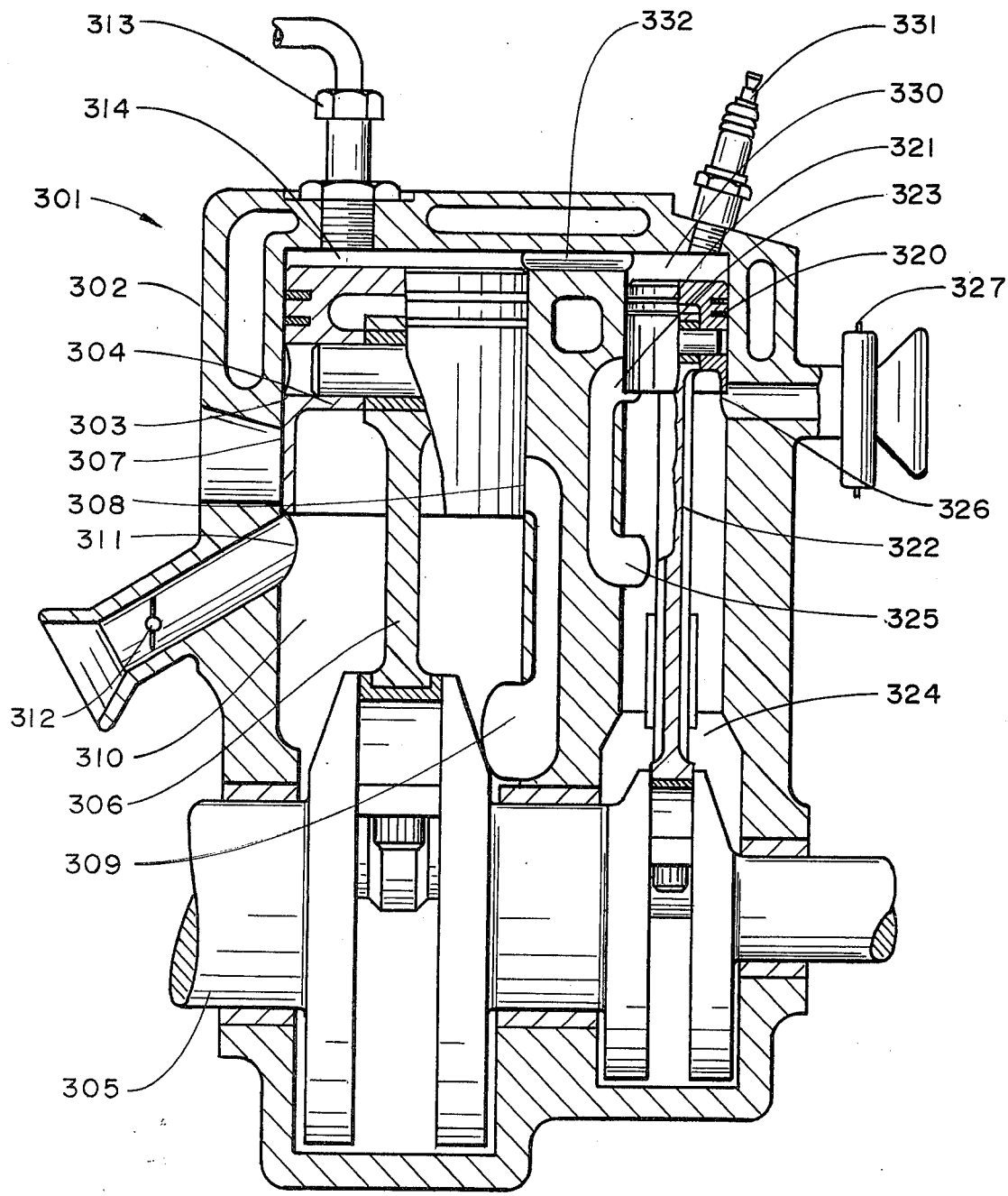
FIG. 5 is a longitudinal section of a single-cylinder two-cycle internal combustion engine in a plane parallel to the crankshaft and through the axes of the main and auxiliary cylinders.

In FIG. 5 there is shown a single cylinder two-stroke cycle engine with auxiliary cylinder. The engine, designated generally as 301, incorporates a block member 302 with main cylinder 303. The main cylinder 303 has a piston 304 which is attached to the crankshaft 305 via the connecting rod 306. The piston 304 controls the opening and closing of the exhaust port 307 and the inlet transfer port 308. Transfer passage 309 interconnects the interior of the crankcase 310 and the inlet port 308. The cylinder 303 has a crankcase inlet port 311 which is opened and closed by the piston 304. Control valve 312 regulates the admission of air to the interior of the crankcase 310. A fuel injector 313 supplies fuel to the main combustion chamber 314 during the upstroke of the main piston 304.

The block member 302 has an auxiliary cylinder 320 which is fitted with a piston 321. The auxiliary piston 321 is connected to crankshaft 305 via connecting rod 322. The auxiliary cylinder 320 has inlet transfer port 323 which is interconnected to the interior of the auxiliary crankchamber 324 via transfer passage 325. The cylinder 320 has a crankcase inlet port 326 which is opened and closed by the auxiliary piston 321. The small carburetor 327 supplies near rich fuel-air mixture to the inlet port 326. The auxiliary cylinder combustion chamber 330 has a spark plug 331. A passage 332 interconnects the auxiliary cylinder combustion chamber 330 with the main combustion chamber 314. Preferred construction details include small minimum volume of chamber 330 when piston 321 is at top dead center and a lagging phase relationship of auxiliary piston 321 relative to main piston 304.

The operation of engine 301 is similar to the operation of a conventional two-stroke cycle engine. As the main piston 304 approaches the top dead center position the spark plug 331 initiates combustion in a near rich mixture in the auxiliary chamber 330. Combustion rapidly releases energy heating these gases and they expand into the main combustion chamber 314 via the passage 332. The upward motion of the auxiliary piston 321 and the small clearance volume of chamber 330 aid in the expulsion of hot residual gases into the main chamber and thereby promote rapid mixing and combustion of the lean overall mixture in the main combustion chamber.

The power stroke ends when the main piston 304 opens the exhaust port 307 and blowdown causes most of the products of combustion to leave the engine. Opening of the transfer ports 308 and 323 by the main piston 304 and the auxiliary piston 321 respectively allow compressed air and compressed fuel-air mixture to scavenge the main and auxiliary cylinders. The compression stroke begins when the exhaust port 307 is closed by the main piston 304.

Control of the engine is primarily by control of the amount of fuel injected per cycle by injector 313. Control of mixture ratio in the main cylinder is by operation of air valve 312. The auxiliary carburetor 327 supplies a near full atmospheric pressure charge to the auxiliary crankchamber 324, thus the auxiliary cylinder may have a near full charge each cycle. This feature ensures minimal effects of exhaust dilution on the initially burned charge, and therefore reliable operation at all torque outputs is assured. Depending upon details of design and construction throttling may be desirable on the auxiliary carburetor 327 for engine idling or deceleration. Also, the fuel injector 313 and air control 312 may be replaced by a main carburetor (not shown) providing lean mixture. Some unburned hydrocarbons in the engine exhaust would be expected with this configuration. Obviously in an engine having a plurality of cylinders there would be an auxiliary cylinder as taught herein associated with each primary cylinder.

What is claimed is:

1. Apparatus of the class described comprising:
   a block member;
   at least one cylinder and a crankshaft rotatably mounted in said block member;
   a piston reciprocable in said cylinder;
   valving means for valving intake and exhaust from said one cylinder;
   at least one auxiliary cylinder in said block member having a swept volume substantially smaller than said one cylinder;
   a piston reciprocal in said auxiliary cylinder;
   inlet ports in said auxiliary cylinder controlled by said auxiliary piston for charging the auxiliary cylinder;
   ignition means in said auxiliary cylinder;
   passage means communicating between said auxiliary cylinder and said one cylinder; and connecting means connecting said pistons to said crankshaft;
   said crankshaft and connecting means providing a predetermined phase relationship between said auxiliary piston and said one piston whereby substantially all of the ignited charge is expelled into said one cylinder providing almost complete combustion in said one cylinder.

2. Apparatus as described in claim 1 wherein the swept volume of the auxiliary cylinder is twenty percent or less than the swept volume of said one cylinder.

3. Apparatus as described in claim 1 wherein the reciprocating means provides a phase relationship in which the auxiliary piston lags said one cylinder piston.

4. Apparatus as described in claim 1 wherein engine output is controlled by throttle control to said one cylinder only.

5. A method of providing a substantially complete combustion in an internal combustion engine having at least one main cylinder having a first piston and a related auxiliary cylinder having a second piston comprising:
   charging the main cylinder of the engine with a lean mixture;
   charging the auxiliary cylinder having a displacement of less than about twenty percent of said main cylinder with a readily ignitable near rich mixture;
   compressing the charge in said main cylinder;
   compressing the charge in the auxiliary cylinder in a predetermined offset phase relationship to said compression of said main cylinder;
   igniting the charge in said auxiliary cylinder; and
   expelling the ignited charge through a continuously open passageway into said one cylinder whereby substantially complete combustion in the cylinders is produced.

6. The method of claim 5 wherein the charge in the auxiliary cylinder is compressed in a lagging phase relationship to said compression of said primary cylinder.

* * * * *